United States Patent [19]

McFadden et al.

[11] Patent Number: 4,974,385
[45] Date of Patent: Dec. 4, 1990

[54] PURLIN AND RAFTER INTERCONNECTION SYSTEM

[75] Inventors: Donald G. McFadden, Connellsville; Raymond M. Schoderbek, Level Green, both of Pa.

[73] Assignee: Naturalite/EPI, Inc., Garland, Tex.

[21] Appl. No.: 350,316

[22] Filed: May 11, 1989

[51] Int. Cl.⁵ .............................................. E04B 5/52
[52] U.S. Cl. ..................................... 52/484; 403/189; 403/294
[58] Field of Search ............... 52/235, 484, 485, 488; 403/187, 189 X, 255, 294 X

[56] References Cited

U.S. PATENT DOCUMENTS

| | | | |
|---|---|---|---|
| Re. 30,432 | 11/1980 | Stoakes | 52/235 X |
| 2,885,040 | 5/1959 | Grossman | 189/72 |
| 2,963,126 | 12/1960 | Cudini | 189/34 |
| 3,052,330 | 9/1962 | Hammitt et al. | 189/34 |
| 3,057,444 | 10/1962 | Walberg | 189/34 |
| 3,081,849 | 3/1963 | Hubbard | 189/34 |
| 3,093,217 | 6/1963 | Doede | 189/34 |
| 3,121,482 | 2/1964 | Cobb et al. | 189/64 |
| 3,155,205 | 11/1964 | Place | 189/78 |
| 3,189,140 | 6/1965 | Luss | 189/41 |
| 3,266,207 | 8/1966 | Birum, Jr. | 52/459 |
| 3,266,210 | 8/1966 | Grossman | 52/690 |
| 3,321,880 | 5/1967 | Ferrell et al. | 52/235 |
| 3,327,438 | 6/1967 | Cooper | 52/484 X |
| 3,356,402 | 12/1967 | Smith | 52/484 X |
| 3,357,144 | 12/1967 | Chauveau et al. | 52/97 |
| 3,363,383 | 1/1968 | La Barge | 52/471 |
| 3,381,434 | 5/1968 | Carson | 52/397 |
| 3,458,052 | 7/1969 | Kann | 403/255 X |
| 3,488,906 | 1/1970 | Brooks | 52/303 |
| 3,527,011 | 9/1970 | Bloom et al. | 52/398 |
| 3,734,550 | 5/1973 | Vance | 287/189 |
| 3,749,432 | 7/1973 | Janssen | 52/238 X |
| 3,774,366 | 11/1973 | Baker | 52/664 |
| 3,778,175 | 12/1973 | Zimmer | 403/187 |
| 3,805,470 | 4/1974 | Brown | 52/400 |
| 3,816,011 | 6/1974 | Biebuyck et al. | 403/187 |
| 3,844,087 | 10/1974 | Schultz et al. | 52/200 |
| 4,008,552 | 2/1977 | Biebuyck | 52/397 |
| 4,047,348 | 9/1977 | McSweeney | 52/484 |
| 4,055,923 | 11/1977 | Biebuyck | 52/235 |
| 4,455,798 | 6/1984 | Tsakiris | 52/200 |
| 4,621,472 | 11/1986 | Kloke | 52/397 |
| 4,640,077 | 2/1987 | Hall | 52/484 X |
| 4,704,831 | 11/1987 | Emmer | 52/235 |

Primary Examiner—David A. Scherbel
Assistant Examiner—Michele A. Van Patten
Attorney, Agent, or Firm—Johnson & Gibbs

[57] ABSTRACT

An interconnection system incorporating a sliding locking member facilitating secured interengagement between a purlin and rafter. The sliding locking member is constructed for slip fit engagement within an extruded section of the purlin and for flanged interlocking with a rafter disposed orthogonally thereto. The purlin further includes an overhanging lip for engaging a web region or vent leg or vent wall of a gutter of the rafter and preventing lateral movement in a first direction. The sliding member prevents movement between the purlin and rafter in second and third orthogonal directions to thereby provide a triaxial securement system that is effected by a single sliding member that is easily moved or slid into position.

20 Claims, 3 Drawing Sheets

PURLIN AND RAFTER INTERCONNECTION SYSTEM

BACKGROUND OF THE INVENTION

1. Field of the Invention

The present invention pertains to purlin-rafter interconnection systems and, more particularly, to purlin-rafter interconnection systems using locking elements therebetween.

2. History of the Prior Art

The interconnection of purlins and rafters in the construction of buildings and roofs is a well developed art. Of primary concern in such interconnection system is the maintenance of the structural integrity of both the rafter and the purlin as well as the interconnection therebetween. Because the more conventional purlin and rafters of skylights are constructed from extruded aluminum, this interconnection is often quite difficult from an assembly standpoint. Complex mounting techniques include special notches and the removal of various structural sections in either the purlin or the rafter. Although notches and/or apertures in the purlin or rafter can be accommodated without adverse structural affect, it is preferable to minimize these modifications to the structural members. Consistent therewith it is important to minimize the amount of field labor required to effect the intersection of the structural members during the erection process. For this reason, many advanced skylights systems incorporate purlin and rafter designs which integrate structural integrity and ease in assembly in a configuration that is economically fabricated. The designs of such configurations are, however, limited by many applications.

Some of the prior art approaches to purlin-rafter interconnections are seen in U.S. Pat. Nos. 3,844,087 and 4,455,798. In each of these patent references, the purlin intersects the rafter with a simple interconnection technique incorporating in some instances a minimum of additional connection elements. For example, in the Schultz U.S. Pat. No. 3,844,087, a skylight structure is shown with a plurality of interconnection pins for interconnecting the purlin and rafters. The pins are secured in apertures in the purlin and project downwardly into the rafter condensate channels to abut the outer condensate channel walls. Longitudinally extending pins may also be inserted into holes where space is formed in the purlins. A notch 57 may likewise be formed in the outer rafter condensate channel to facilitate interconnection of the purlin and rafter. In the Tsakoris U.S. Pat. No. 4,455,798, a purlin-to-rafter tie is shown in the form of a locating pin 154 which includes a top section 156 which is of generally square cross-section and a lower narrow ribbed section 158. A rafter is provided with a transverse channel 164 disposed at a position along the rafter where the purlin is to be secured. Channel 164 is adapted to align with an elongated groove in an adjacently disposed purlin. Upright walls 166 define groove 165 into which the ribbed bottom section 158 of the locating pin is disposed.

Other forms of purlin and rafter interconnection systems have been devised in the prior art. In the main, these require substantial modification to either the purlin or the rafter or the interconnection therebetween. Additionally, the connecting members are sufficiently complex design so as to require particular tools and/or teachings for assembly. In many applications the simplicity of the installation in conjunction with the structural integrity thereof is the critical aspect. For this reason it would be an advance over the prior art to provide such an interconnection system facilitating simplicity in design and ease in assembly.

The present invention provides such an interconnection system by incorporating an overhanging lip cut in a first frontal face of a purlin and the utilization of a lock and key member in a central extrusion of the purlin to engage a transverse groove through a support rafter. Engagement is effected by a driven generally T-shaped key of, e.g., molded aluminum, plastic, or any similar material, which slides through the central extrusion portion of the purlin and interlocks with the transverse groove of the load bearing rafter. The key may include a projecting portion to facilitate the engagement and to prevent disengagement.

SUMMARY OF THE INVENTION

The present invention overcomes the shortcomings and problems mentioned above by providing a purlin and rafter interconnection system including means for creating a shear block upon engagement of a purlin and rafter and unitary means for locating the purlin and for locking it to the rafter.

An object of the present invention is to provide an improved method for joining two support members.

Another object of the present invention is to provide a method for permitting members having complex shapes to be interconnected at acute or at right angles.

Another object of the present invention is to provide a positive method to transfer water infiltration and condensation from purlin to rafter members.

Yet another object of the present invention is to provide an easy and quick method for joining extruded aluminum members.

Still yet another object of the present invention is to provide an interconnection system that allows for expansion and contraction of the interconnection system.

A further object of the present invention is to provide an interconnection system in which only one element in addition to the purlin and rafter is required.

Yet a further object to the present invention is to provide an interconnection system inherently including a sheer block, means for preventing the rafter from pulling up under negative load, and means for preventing shifting between the purlin and rafter.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION OF THE INVENTION

Figure 1:
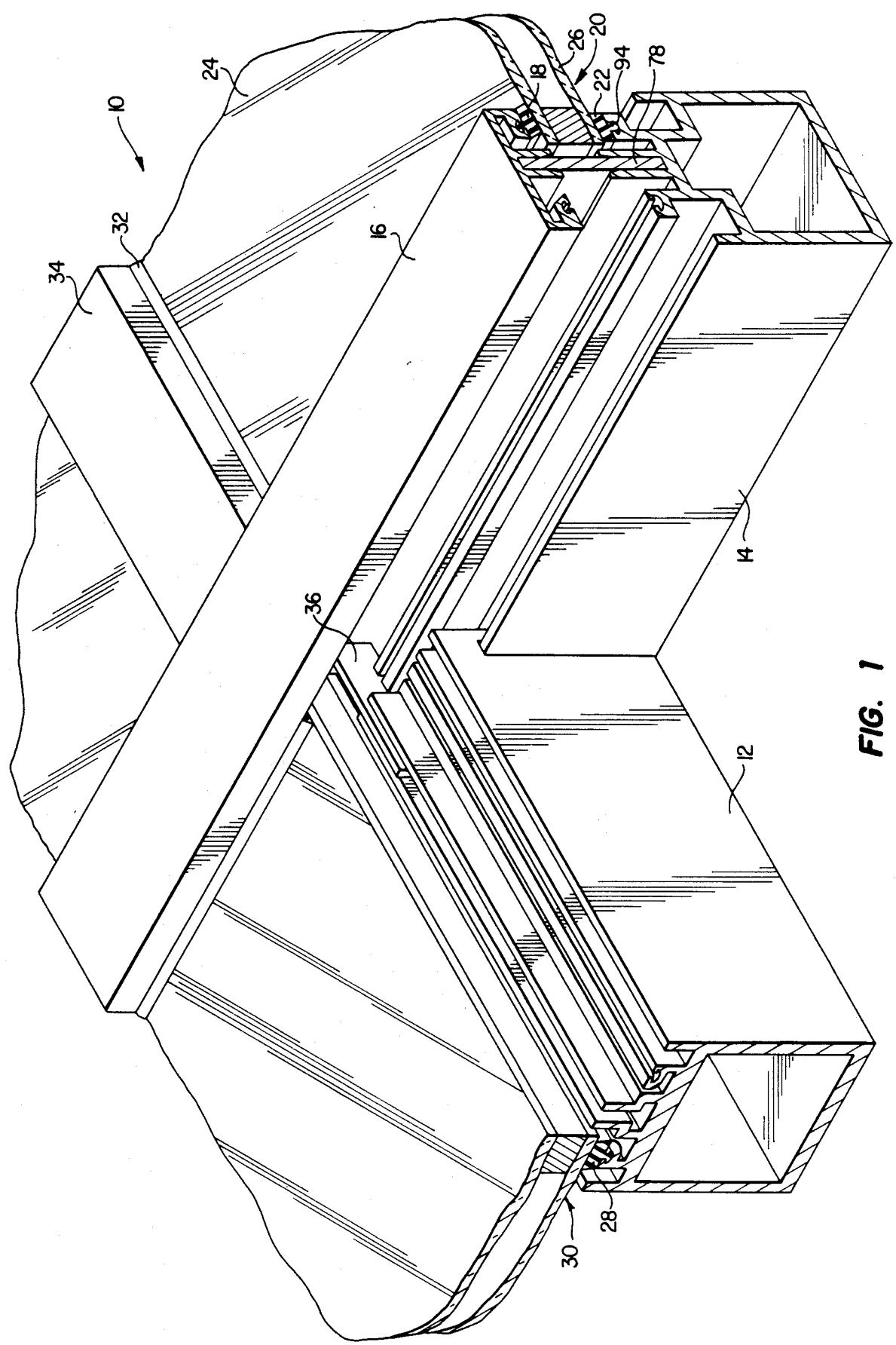
FIG. 1 is the perspective view of one embodiment of purlin-rafter interconnection assembly constructed in accordance with the principle of the present invention.

Referring now to the drawings wherein like reference numerals designate like or corresponding elements throughout the several views, a purlin-rafter interconnection system, generally designated by reference numeral 10, is shown in FIG. 1. Although those skilled in the art know that interconnected purlins and rafters may serve many purposes, only one particular purpose, that purpose being forming a portion of the skylight structure, is shown in FIG. 1. The purlin and rafter shown interconnected in FIG. 1 are designated by reference numerals 12 and 14, respectively. In order to form part of the skylight structure, rafter 14 cooperates with capping element 16, e.g., a mullion, and rubber sealing, gripping and spacing elements 18, 20, 22 to help hold in position a glazing infill unit or construction or panels (shown in FIG. 1 as two glazing panels 24, 26). Likewise, purlin 12 cooperates with rubber sealing, gripping and glazing infill units or panels [including spacing elements 28 (which could actually be the same seal or gasket piece as element 22), 30 and a third such element which is not shown but which corresponds to element 32] and with a capping element (which is not shown but which corresponds to element 34) to help hold the glazing infill construction in position. Recognizing that purlin 12 is one of a number of similar purlins orthogonally connected across from each other on opposing sides of a plurality of rafters, it should be readily appreciated that a substantial portion of the skylight structure includes a number of square or rectangular panel framing members, each purlin serving to partially hold two separate glazing panels, each rafter serving to hold a plurality of panels, and each panel being held by two adjacent rafters and purlins. Also shown in FIG. 1 is key 36, an element that forms an important part of the present invention and which is described in detail below.

Figure 2:
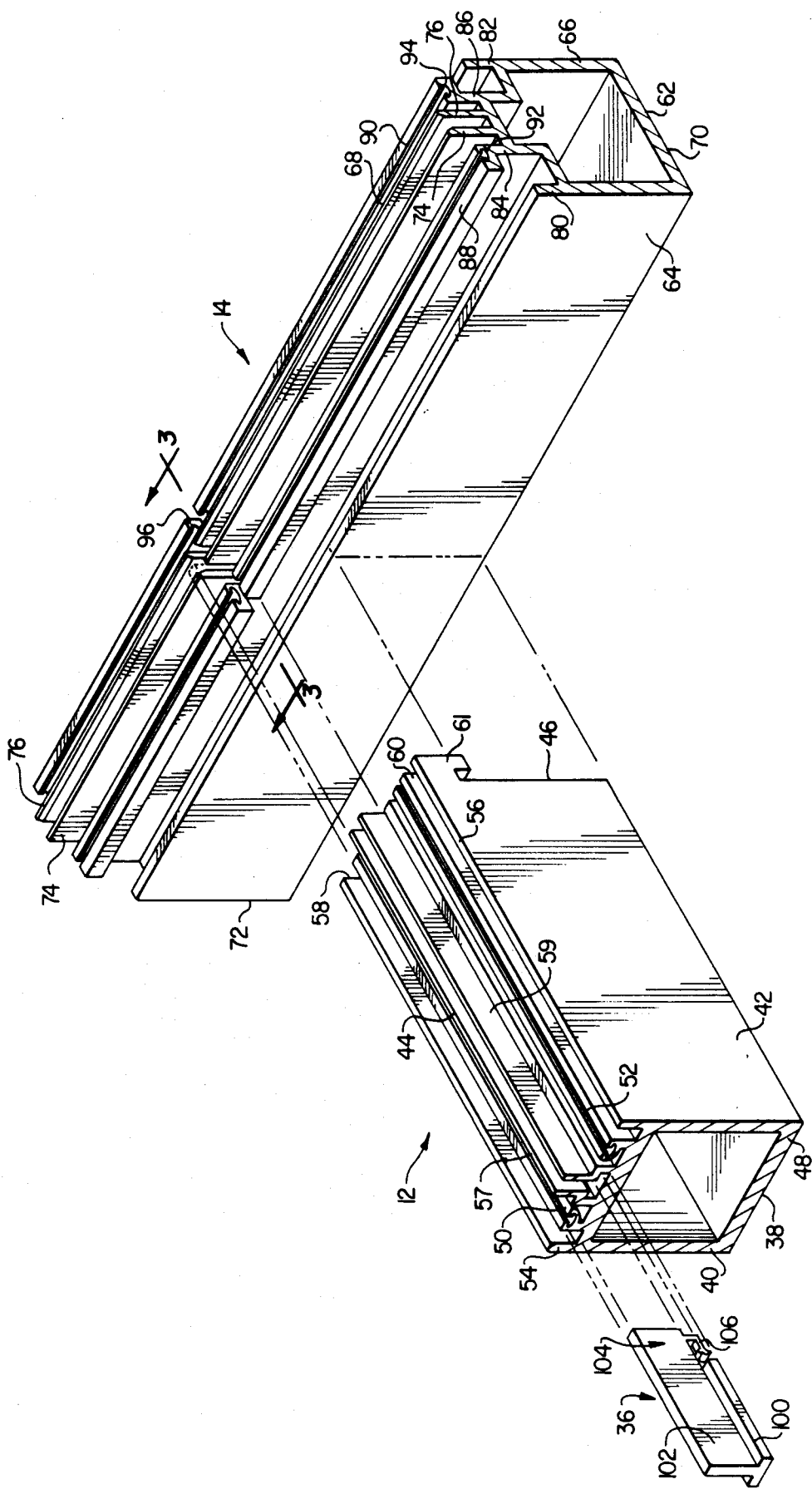
FIG. 2 is an exploded perspective view of the purlin and rafter elements of FIG. 1.

Referring now to FIG. 2, a purlin 12 and rafter 14 to be interconnected, as well as key 36, are shown alone and separated in order to be more clearly seen and to faciliate the description thereof.

Continuing to refer to FIG. 2, purlin 12 can be seen to have a hollow beam shape with a lower side 38, left side 40, right side 42, complex upper side 44, front end 46 and rear end 48.

The complex upper side 44 of purlin 12 warrants close examination. The upper side 44 includes seal supporting portions 50, 52 which form mushroom-receiving shaped grooves for firmly holding seal elements such as seal elements 28 and 32 shown in FIG. 1. Adjacent to left side 40 and right side 42 of purlin 12, upper side 44 has portions defining two walls 54, 56. In the embodiment shown, walls 54, 56, together with seal support portions 50, 52 and portions of upper side 44 that are intermediate to and lower than portions 50, 52, 54, 56 form channels 58, 60 to serve various functions well known to those skilled in the art, e.g., collecting condensation and/or liquid runoff. Certain of the above-described portions of complex upper side 44 of purlin 12 play important roles in the operation of the present invention. Exactly what structure plays such roles, further details about that structure, and further details about the roles played by that structure will be described below.

One further aspect of purlin 12 that should be noted at this point is that portions of purlin 12, those portions being disposed generally at the interface of complex upper side 44 and front end 46, are shaped so as to form a hook or lip structure 61 overhanging front end 46. This structure 61 will be discussed further below.

Rafter 14, like purlin 12, is shown in FIG. 2 to have a hollow beam shape with a lower side 62, left side 64, right side 66, complex upper side 68, front end 70, and rear end 72. Again, as was the case with purlin 12, the complex upper side 68 of rafter 14 warrants close examination. Complex upper side 68 of rafter 14 has a number of portions which project upwardly to some extent. Specifically, upper side 68 includes upwardly projecting portions 74, 76 which form a central channel or groove on upper side 68 for (with reference to FIG. 1) receiving a bridging element 78 to assist in securing cap 16 to rafter 14.

Upper side 68 of rafter 14 further has projecting portions 80, 82 which form elongate walls along the side edges of the upper side of rafter 14. These walls play an important role in the structure and operation of the present invention, which role will be discussed in greater detail below.

Still further, rafter 14 has upwardly projecting portions 84, 86 disposed between projecting portions 80 and 84, and 82 and 86, respectively. The portions 84, 86, in addition to having upwardly projecting subportions, have generally horizontally disposed subportions 88, 90. These subportions are disposed at the uppermost ends of the upwardly projecting portions 84, 86. The horizontally disposed subportions 88, 90 are further characterized in that they overhang the projecting portions 84, 86 in the direction of walls 80, 82, respectively.

Generally horizontally disposed subportions 88, 90 perform several functions. The first function is performed in part because those subportions 88, 90 have still further subportions which define seal receiving grooves 92, 94. Referring back to FIG. 1, groove 94 is shown retaining seal 22, which seal further cooperates with another seal 20 to support glass pane 26. A second important function performed by generally horizontally disposed subportions 88, 90 is a function relating to the present invention. This function and how the heretofore described structure performs this function, is described below.

Still yet another important characteristic of upper side 68 of rafter 14 is that the various projecting portions; which, as can be seen in FIG. 2, form essentially elongate, longitudinal structures; are interrupted so as to form a transverse groove 96. As with overhanging lip structure 61, wall 80, generally horizontally disposed subportion 92, as well as with all other structures and elements which have been heretofore been indicated as playing roles in the system of the present invention, transverse groove 96 will be described further below.

At this point, a discussion of the formation of purlin 12 on rafter 14 is warranted. As shown in the various figures, purlin 12 and rafter 14 may be formed by extruding aluminum or material having similarly desired characteristics. Various portions of the purlin 12 and rafter 14 that cannot conveniently be formed by this process may be added by conventional, well-known techniques such a saw cutting. For example, transverse groove 96 could very easily be formed by a saw cut. Overhanging lip structure 61 of purlin 12 could also be formed by the various cutting techniques well-known to those skilled in the art. Alternately to being essentially solid members, either purlin 12 and rafter 14 (or both of them) may be a composite structure (or composite structures). An example of this would be a rafter comprising a solid beam of wood, with extruded aluminum portions suitably fastened (e.g., by screws or glue) thereto, the extruded aluminum portions being some (or all) of e.g., the projecting portions of the upper side 68 described above. Even in such a case, finishing with saw cuts could very likely be employed. Those skilled in the art should readily appreciate how the heretofore described rafters and purlins may be formed, including obvious other techniques not described herein.

Figure 5:
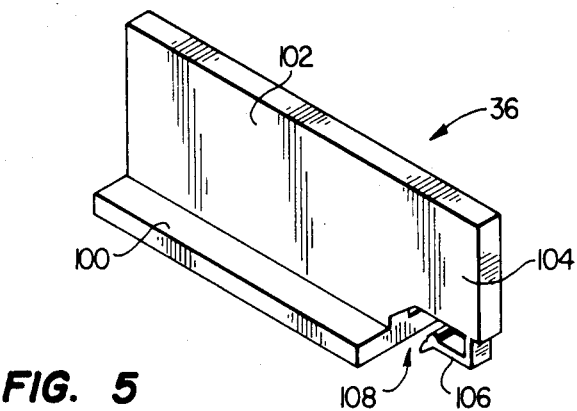
FIG. 5 is a perspective view of an interconnection linkage element constructed in accordance with the principles of the present invention.

It has been discussed above that bridging element or key 36 forms an important part of the present invention. Referring now to FIG. 5, key 36, shown therein may be seen to comprise a base portion 100 and a centrally disposed, perpendicularly projecting portion 102. In essence, portions 100 and 102 form an inverted, elongated T-shaped element, although, it is important to note, portion 102 extends beyond one of the ends of base 100. In FIG. 2, this extending portion is generally designated by reference numeral 104. In FIG. 5, key 36 may also be seen to have a portion 106. Portion 106 is, in essence, a clip. Portion or clip 106, as illustrated in FIG. 5, is located on portion 102 in a position that would be occupied by base 100 if base 100 extended further. Clip 106 has various subportions clearly shown in FIG. 5 which subportions allow the clip, in standard operation, to be resiliently depressed toward portion 104. Accordingly, a structure (not shown in FIG. 5) passing immediately under element 102 and moving in the direction of base 100 (or alternatively, of course, if key 36 were moved over a structure so that base 100 were to approach the structure) could cause clip 106 to be pressed upwardly toward portion 104. Once the structure passes clip 106 into the void between clip 106 and base 100 (generally by reference numeral 108 in FIG. 5), where that structure could be designed to fit, clip 106 could reassume its non-retracted position and act so as to prevent the structure from moving in the direction away from base 100, past clip 106.

With regard to the composition of key 36, key 36 shown in FIG. 5 could conveniently be molded of plastic, as strength of portions 102 and 100 could easily be made satisfactory while strength and resiliency of clip 106 could also be assured. Alternately, key 36 could be formed by extruded or cast aluminum or some other such suitable material. Key 36 could very conveniently be formed as a unitary whole, although it could also be formed of connected subelements. Those skilled in the art should readily appreciate various other ways, obvious in view of the above discussion, to form key 36.

Referring again first to FIG. 2, the operation of the interconnection system of the present invention will now be discussed.

As a first step, key 36 is inserted into a groove formed by elongate portions 57, 59 of upper side 44 of purlin 12. It should be noted that the groove formed by portions of 57, 59 is inverted T-shaped, which is ideally suited to receive generally inverted T-shaped key 36. The groove formed by portions 57, 59 should be appreciated to effectively comprise two sets of generally opposed surfaces which cooperate with the sets of generally opposed surfaces, formed by portions 100 and 102 of key 36 to retain the key 36 in place in the groove. An important point with regard to orientation of key 36, the importance of which point will become clear from further discussions below, is that extending portion 104 of key 36 is the first portion of key 36 inserted into the groove formed by portions 57, 59. Clearances are provided between the external surfaces of key 36 and the various sides of the groove formed by portions 57, 59 to allow key 36 to easily slide in that groove.

As a second step, overhanging lip portion 61 (or portions, as there may be multiple such structures across the front face of purlin 12 is draped over wall 80 of rafter 14. That is, wall 80 is positioned under and up portion 61, adjacent to front end 46 of purlin 12. This draping or positioning is illustrated in FIGS. 1 and 3.

Several points should be noted at this point. First, it should be noted that because of the action of portion 61 resting against the inside gutter wall (for this structure is similar to structure forming, e.g. gutter 60 of purlin 12), purlin 12 is held against rafter 14 so as to resist any attempt to directly and uniformly separate them, i.e., by pulling them directly apart. Second, as best seen in FIG. 3, wall 80 is notably smaller than the groove in which it projects, i.e., that groove between portion 61 and face 46. This allows for expansion and contraction of the system at this point. Given that an overall system will comprise many such points, this design allows for "spreading" of expansion and contraction of a system throughout the system. Third, portion 61 also acts as a drip leg thus preventing capillary water from running back out of the gutter into the rafter. A fourth point that should be noted is that although the steps described above were designated as first and second steps, order in which those steps are actually performed is immaterial.

After portion 61 of purlin 12 is positioned or draped over wall 80 of rafter 14 and after key 36 is properly positioned within the groove formed by portions 57, 59 of purlin 12, key 36, because of the clearances mentioned above, is free to slide along the groove in which it is placed toward rafter 14.

Figure 3:
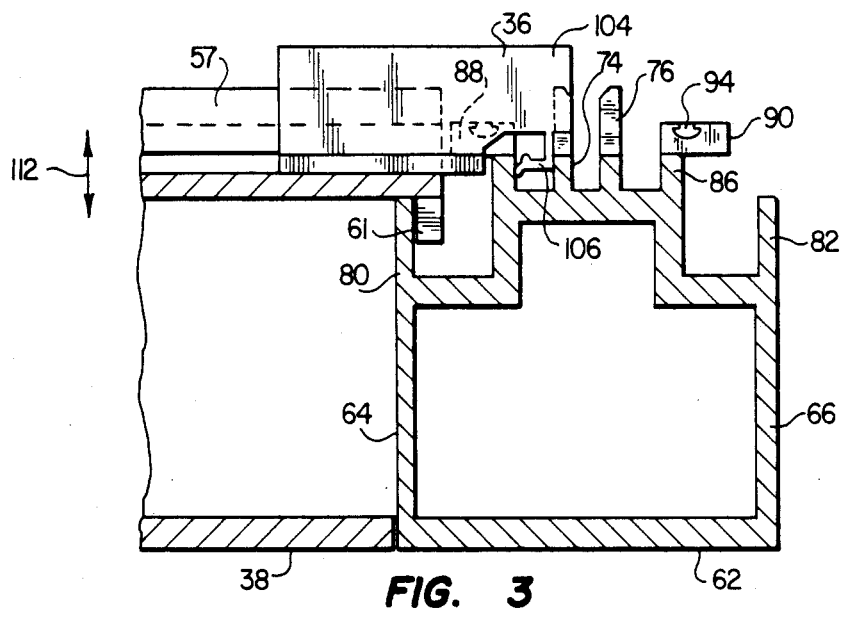
FIG. 3 is a side elevational cross sectional view of the purlin-rafter intersection of FIG. 1.
Figure 4:
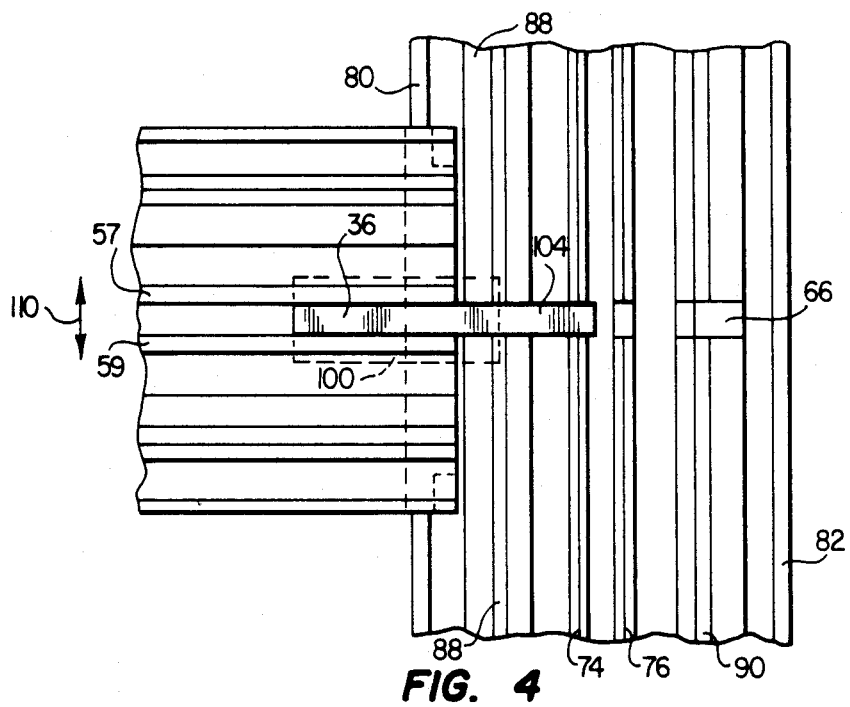
FIG. 4 is a top plan view of the purlin-rafter interconnection of FIG. 3.

Referring now to FIGS. 3 and 4, it should be noted that portion 104 of key and transverse groove 96 of rafter 14 are so relatively positioned that portion 104 neatly fits into groove 96. On the other hand, absence of groove 96, e.g., uninterrupted wall portions 88, 90 operate to prevent further movement of key 36 as soon as the leading edge of portion 104 of key 36 strikes such a wall portion 88, 90. Thus, those skilled in the art should appreciate the fact that key 36 may continue to slide into groove 96 in the rafter, even after portion 106 of key 36 would be blocked by portions of the rafter in the absence of groove 96, causes groove 96 to effectively perform a locating function. Typically, purlins are positioned on immediately opposite sides of a rafter. A single transverse groove, which inherently opens on immediately opposite sides of a rafter, facilitates this positioning.

Continuing to refer to FIGS. 3 and 4, it may be noted that as key 36 continues to move along its groove in the purlin 12 into transverse groove 96 of rafter 12, the leading portion of base 100 of key 36 eventually comes under overhanging portion 88 of rafter 14. As forward movement continues, larger amounts of base 100 come under portion 88. Referring to FIG. 3, a portion of portion 88 is shown in phantom above a portion of base 100. With regard to FIG. 4, because of the orientation therein, base 100 can be seen in phantom beneath portion 88 of rafter 14.

An important aspect of the present invention is that clearances between key 36 and the grooves through which it slides steadily decrease so that as key 36 is driven further down the purlin groove into groove 96, it comes to hold itself firmly in place. That is, clearances are reduced to the point that pressure exerted by various structure on the key, as well as friction, operates to hold key 36 firmly in place in a position bridging or spanning purlin 12 and rafter 14.

As has been previously mentioned, interaction of portions 61 of purlin 12 and wall 80 of rafter 14 act to prevent those two elements from being pulled immediately and uniformly apart. Those skilled in the art should really appreciate that other structure of the present invention, because of its shape and because of how it interacts within itself, prevents purlin 12 and rafter 14 from separating in two different directions, orthogonal to each other and to the first direction mentioned above. Specifically, the fact that key 36 spans two aligned grooves in purlin 12 and rafter 14 ensures that the front face 46 of purlin 12 cannot slide along the left side 64 of the rafter 14 or vice versa. These directions are indicated by arrow 110 in FIG. 4. Additionally, engagement of the bottom of key 36 which the grooves in which it rides, as well as interaction of base 100 of key 36 with portion 88 of rafter 14, prevents up and off or down and off movement of front face of purlin 12 and left side of rafter 14. The directions of these movements are indicated by arrow 112 in FIG. 3.

From the foregoing description, those skilled in the art should fully appreciate the structure, operation, construction and advantages of the present invention. Obviously, numerous modifications and variations of the foregoing are obvious in view of the teachings herein. For example, key 36 could be formed without clip portion 106. Such a key 36 could be held in place solely by friction. Other modifications and variations of the key and all of the other elements of the present invention are possible. Accordingly, the present invention should not be considered to be limited by the description above, but is limited only by the scope of the appended claims.

What is claimed is:

1. A purlin and rafter interconnection system comprising:
   means for preventing movement in a first direction, which movement would immediately and uniformly act to separate an interconnected purlin and rafter; and
   Comprising a slidably insertable, friction held interlocking element directions to said first direction, whereby triaxial securement is provided.

2. A system as recited in claim 1, wherein said purlin has portions forming a lip, wherein said rafter has portions forming a wall, and wherein said means for preventing movement in a first direction comprises said lip and said wall.

3. A system as recited in claim 1, wherein said purlin has portions defining a first groove, wherein said rafter has portions defining a second groove, and wherein said means for preventing movement in second and third orthogonal directions substantially comprises said portions defining said first groove, said portions defining said second groove, and a slidably insertable, friction held interlocking element adapted to slide in said first groove and second groove to a position spanning said purlin and said rafter.

4. A system as recited in claim 3, wherein said slidably insertable, friction held interlocking element is held in position by friction and a depressible interlock.

5. A system as recited in claim 3, wherein said slidably insertable, friction held interlocking element is substantially T-shaped.

6. A system as recited in claim 5, wherein said slidably insertable, friction held interlocking element has portions facilitating engagement of said purlin and said rafter.

7. A system as recited in claim 6, wherein said portions facilitating engagement of said purlin and said rafter comprise a clip.

8. A system as recited in claim 1, employed in a skylight structure.

9. A purlin-rafter interconnection system comprising:
   (a) at least one purlin having a surface portion, a lip portion overhanging said surface portion, and portions defining a guide groove generally orthogonally disposed relative to said surface;
   (b) at least one rafter having a surface portion against which said surface portion of said at least one purlin may be positioned, a wall adapted to engage said lip portion of said at least one purlin in a hooked manner when said surface portion of said at least one purlin is positioned against said surface portion of said at least one rafter, and portions defining a guide groove having an end aligning with a corresponding end of said guide groove in said at least one purlin when said surface portion of said at least one purlin is positioned against said surface portion of said at least one rafter; and
   (c) a locking member adapted to slide through portions of said guide groove in said at least one purlin and portions of said guide groove in said at least one rafter and to interlock said at least one purlin and said at least one rafter in a position spanning said guide grooves.

10. A system as recited in claim 9, wherein said rafter wall and said purlin lip loosely engage.

11. A system as recited in claim 9, wherein said locking member is substantially T-shaped, having orthogonally disposed portions.

12. A system as recited in claim 9, employed in a skylight structure.

13. A purlin-rafter interconnection system comprising:
   (a) at least one purlin having a surface portion, a lip portion overhanging said surface portion, and portions defining a guide groove generally orthogonally disposed relative to said surface;
   (b) at least one rafter having a surface portion against which said surface portion of said at least one purlin may be positioned, a wall adapted to engage said lip portion of said at least one purlin when said surface portion of said at least one purlin is positioned against said surface portion of said at least one rafter, and portions defining a guide groove having an end aligning with a corresponding end of said guide groove in said at least one purlin when said surface portion of said at least one purlin is positioned against said surface portion of said at least one rafter; and
   (c) a locking member adapted to slide through portions of said guide groove in said at least one purlin and portions of said guide groove in said at least one rafter and to interlock said at least one purlin and said at least one rafter in a position spanning said guide grooves;
   wherein said locking member is substantially T-shaped, having orthogonally disposed portions; and
   wherein said orthogonally disposed portions of said T-shaped locking member engage portions of said rafter to directly oppose movement of said locking member relative to said rafter in orthogonal directions.

14. A system as recited in claim 13, wherein said orthogonally disposed portions of said T-shaped locking member engage portions of said purlin to directly oppose movement of said locking member relative to said rafter in orthogonal directions.

15. A skylight structure comprising:
   (a) a sliding locking member having at least two set of generally opposed surfaces;
   (b) a purlin having an end which it is desired to rigidly position against a rafter, portions defining a hook overhanging said end, and portions defining a first guide groove, said guide groove having at least two set of generally opposed surfaces adapted to cooperate with said at least two sets of generally opposed surfaces of said sliding locking member to retain it in said first slot and to allow it to slide a predetermined distance within said first guide groove; and
   (c) a rafter having a side wall against which an end of a purlin may be positioned, and portions defining an second groove which generally aligns with said first guide groove when said end of said purlin is positioned against said side wall of said rafter.

16. A structure as recited in claim 15, wherein said sliding locking member has portions operable to extend into said second groove when slid said predetermined distance within said first guide groove.

17. A structure as recited in claim 16, wherein said sliding locking member is, after having slid said predetermined distance, held in place substantially by friction.

18. A structure as recited in claim 17, wherein said sliding locking member is substantially T-shaped.

19. A structure as recited in claim 18, wherein said sliding locking member further comprises portions facilitating engagement of said purlin and rafter.

20. A structure as recited in claim 19, wherein said portions facilitating engagement comprise a resilient portion.

* * * * *